Figure 1:
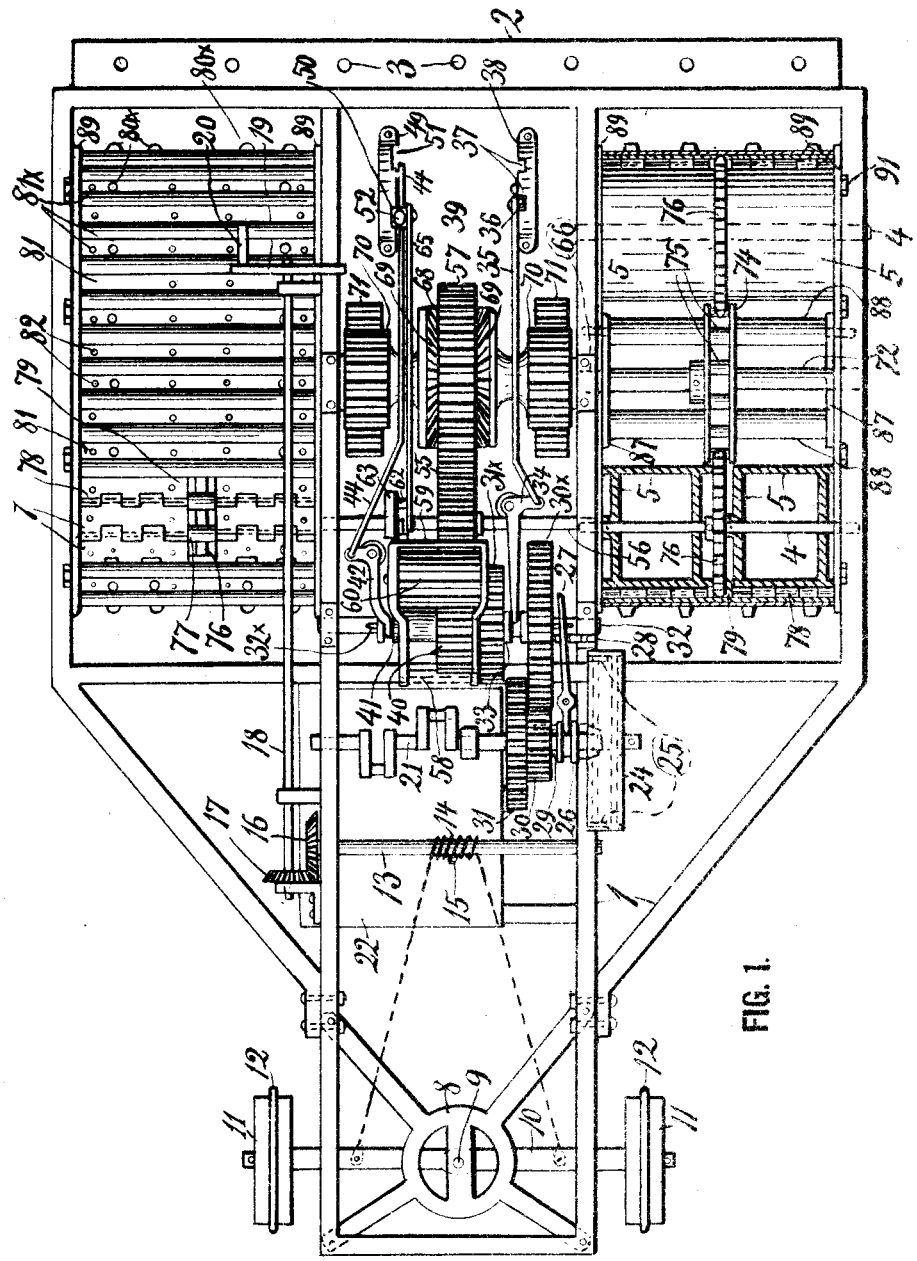

J. PITTINGS.
TRACTOR.
APPLICATION FILED APR. 8, 1913.
1,130,018.
Patented Mar. 2, 1915.
2 SHEETS—SHEET 2.
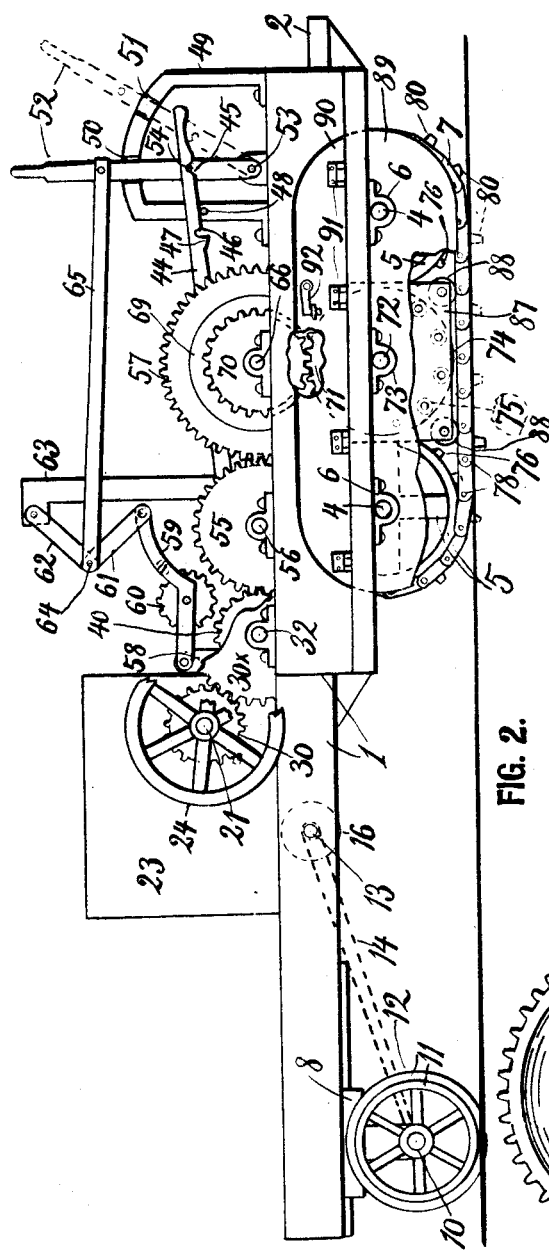
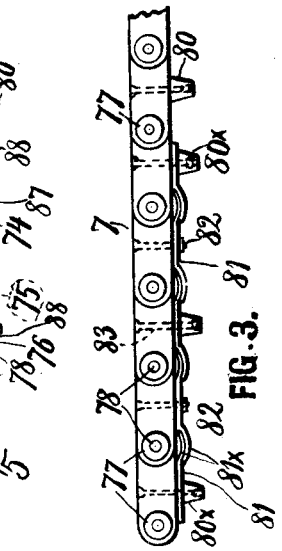
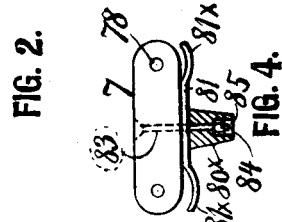
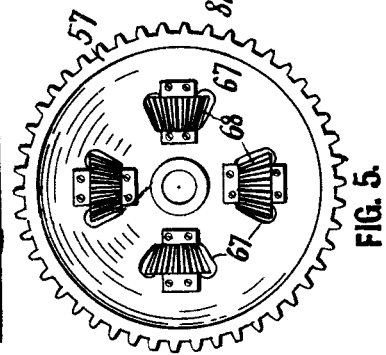
WITNESSES:
A. E. Carlsen
D. E. Carlsen
INVENTOR:
John Pittings.
BY HIS ATTORNEY:
A. M. Carlsen.

UNITED STATES PATENT OFFICE.

JOHN PITTINGS, OF ANTLER, NORTH DAKOTA.

TRACTOR.

1,130,018.      Specification of Letters Patent.      Patented Mar. 2, 1915.

Application filed April 8, 1913. Serial No. 759,807.

*To all whom it may concern:*

Be it known that I, JOHN PITTINGS, a citizen of the United States, residing at Antler, in the county of Bottineau and State of North Dakota, have invented a new and useful Tractor, of which the following is a specification.

My invention relates to traction engines or tractors adapted to draw plows, harrows and any thing else adapted to be drawn.

The objects of the invention are, first, to provide a tractor with efficient self-laid tracks, second, to provide a tractor with easily manipulated reversing means; third, to provide a tractor with easily applied speed changing means. These and other objects I attain by the novel construction and arrangements of parts illustrated in the accompanying drawings in which:—

Figure 1 is a partly sectional top or plan view of a tractor or traction engine adapted to be run by any suitable motor and for that reason the engine or other motor is simply represented by a crank shaft. Fig. 2 is a side elevation of the tractor shown in Fig. 1 with a few gears and other parts omitted because fully shown in other views. Fig. 3 is an inner edge view of an enlarged portion of one of the endless self laid tracks in the most complete form. Fig. 4 is one of the links or sections shown in Fig. 3 on an enlarged scale and with the calk in central section. Fig. 5 is a side view of the gear wheel 57 in Figs. 1 and 2 on an enlarged scale showing the bevel pinions mounted in it and projecting from both sides thereof.

Referring to the drawings by reference numerals, 1 designates the main traction frame having a rear cross bar 2 with holes 3 for hitching thereto separators, self binders, mowers, plows, &c., to be drawn. Said frame is mounted on shafts 4 fixed in drums 5 and having their ends, journaled in bearing 6 on the frame, and stretched over the drums are endless broad link-belts 7, constituting endless self-laid tracks for the drums to roll on, as will presently be more fully described. The front end of the frame is provided with a fifth-wheel 8 at the center of which is pivoted by a king-bolt 9 to swing in horizontal plane an axle 10, whose ends are supported by steering wheels 11 having peripheral ribs 12 to prevent lateral skidding of the wheels on the ground. Rearward of the axle 10 is journaled in the frame a shaft 13, upon which is partly wound the middle portion of a chain 14, which may be secured to the shaft by a staple or other means 15, and has its ends secured to the steering axle 10, one near each end thereof. At one end of the shaft 13 is fixed a bevel gear 16, which meshes with a bevel pinion 17, the latter pinion is fixed on a longitudinal shaft 18 having at its rear end a hand wheel 19 which may have a crank handle 20 by which a shaft is turned and the tractor steered when in motion. Turning again to the traction mechanism, the crank shaft 21 represents a rotary shaft of an engine or other motor mounted upon a platform 22 and may be inclosed in a housing 23 (shown in Fig. 2). On said driving shaft 21 is fixed a flywheel 24 having friction clutch members 25 operated by a conical clutch head 26, which slides on the shaft and is controlled by a shifting lever 27, which may be thrown into either one of two notches in a rib 28 fixed on the frame. Said clutch head has two keys slidable in a cog wheel 30 which is fixed to a larger cog wheel 31, both of which are normally rotatable but not slidable on the shaft.

Rearward and downward of the motor shaft 21 is journaled in the frame a shaft 32, having a long key $32^x$. On this shaft and key is slidably mounted a sleeve 33 having a peripheral groove engaged by a shifter fork 34, which is controlled by a rod 35 and a hand lever 36, the latter arranged for engagement alternately in two notches 37 of a fixed bracket 38, which is fixed upon the rear platform 39 or any other suitable part of the main frame. To one end of the sleeve 33 is fixed a cog wheel $30^x$ adapted to mesh with the cog wheel 30 when the tractor is to move slowly, and at the other end of the sleeve is fixed a cog wheel $31^x$ adapted to mesh with the wheel 31 when the tractor is to move at a higher speed without changing the speed of the motor shaft. Upon the shaft 32 and its key is also slidably mounted a cog wheel 40 having a peripherically grooved hub 41 engaged by a shifter 42, the latter is controlled by a rod 44 and a hand lever 52, said rod 44 having the lower edge of its rear end portion provided with two shallow notches 45 and 46, the latter notch however having its front edge extended downward as shown at 47 in Fig. 2. Said notch 46 is adapted to engage a stud 48 fixed in a bracket 49, which is secured upon the rear end of the frame and provided with two notches 50, 51, for the hand lever 52 to engage; said hand-lever being pivotally secured at 53 and provided with a stud 54 arranged for engagement with the notch 45.

The cog wheel 40 normally meshes with an idler gear 55, which is mounted on a shaft 56 and meshes with a differential gear 57 (best shown in Fig. 5) by which the traction wheels and tracks are operated when the tractor is moving forward; but in order to reverse its movement the following means are employed.

Pivotally mounted to swing on a horizontal axis on a post 58 is a yoke 59 in which is journaled a pinion 60, whose face is as wide as the faces of the two gears 40 and 55 together, so as to engage both of them when gear 40 is slid out of mesh with gear 55. Said yoke 59 and its pinion are normally suspended by two links 61, 62 and a post 63 of the frame (best shown in Fig. 2). Said links form a knee-joint 64 which by a rod 65 is connected with the lever 52.

From the description just given it will be understood that while the motor is running a given speed the speed of the tractor on the ground may be increased by throwing the lever 36 into the rear notch 37, and when said lever is in the front notch the tractor will travel slower and pull more powerfully. And that when the tractor is to be reversed the operator in throwing the lever 52 from the full line position to the dotted line position shown in Fig. 2, the first part of the stroke of the lever causes rod 44 to slide the gear 40 out of mesh with gear 55 while the rod 65 causes but a partial lowering of the pinion 60; and as the lever is swung farther rearward the shoulder 47 of the rod engages the pin 46 and enables the lever to force the stud 54 out of the notch 45 and permit the rod 44 to drop sufficiently to have its notch 46 engaged by the stud 48, whereby the gears are held out of mesh while the further rearward swinging of the lever 52 causes the pinion 60 to descend into mesh with the gears 40 and 55, whereby the tractor is reversed without reversing the engine or motor. When forward movement of the tractor is again desired the lever 52 is swung forward from notch 51 to 50. During such movement of the lever the pin 54 reënters notch 45 while rod 65 raises the pinion 60 out of mesh, and by further motion of the lever the rod 44 restores the gear 40 into mesh with gear 55, so that when the motor is running, a single forward stroke of the lever causes the machine to move forward and a single rearward movement of the same single lever causes the machine to move rearward.

On a closer consideration of the traction mechanism actuated by the differential gear 57, it will be noted that said gear 57, which might well be termed the equalizing gear, is rotatably mounted on a shaft 66 and is provided with several apertures 67, (see Fig. 5) in which are mounted bevel pinions 68 meshing with two bevel gears 69, which are also mounted to rotate on the shaft and are each provided with a gear pinion 70 meshing with one of the gear wheels 71. The mechanism driven by each of the bevel gears 69 being alike in both sides of the machine, the following description of one side will answer for both sides: The gear wheel 71 is fixed on the inner end of a shaft 72, which is journaled in bearings 73 and has affixed to it a wheel 74, having a peripheral groove with rollers 75 mounted therein and arranged to engage the teeth of two sprocket wheels 76, which are fixed upon the shafts 4 of the drums or broad-faced wheels 5. Said wheels 76 also engage anti-friction rollers 77 which rotate upon the pivot rods 78 of the track chains 7. Said track chain is preferably composed of two parallel halves, (as best shown in the upper part of Fig. 1) leaving an intermediate space 79 traversed by said pivot rods and occupied by the rollers 77 on same. The track chains may possibly be used in this simple form with or without calks 80 fixed on them, but I prefer to cover the joint of the link belt track by external shielding plates 81, secured by bolts 82 and having curved portions 81ˣ overlapping each other at the joints of the track. Said curves of the plates will not only exclude sand and dirt from the joints but will also act as calks for taking hold of the ground. Still I provide further calks 80ˣ, (see Figs. 3 and 4) which are preferably secured to the plate 81 by bolts 83 passed through the link and the plate and having its nut 84 housed in a cavity 85 of the calk so as not to get damaged or turned by contact with the ground. Of course when this arrangement is used the calks 80 are omitted from the links of the track, though they may be used as calks 80ˣ by using slightly longer securing bolts. Thus the plates 81 may be regarded as attachments to the endless track. In the upper part of Fig. 1 three of the plates 81 are removed to expose the track chain and two of the rollers 77 in same.

From the main frame depend frame plates 87 in which are journaled the ends of transverse rollers 88, which assist in keeping the lower run of the track chain straight and thus in more active contact with the ground. To said plates 87 and to the frame are secured shielding plates 89 fitting closely to the edges of the track chain so as to exclude dirt from it and its driving mechanism. The upper portion 90 of said plates 89 are hinged at 91 to form doors which are held closed by catches 92. of which one is shown in Fig. 2. Said doors are to give access to the interior of each traction mechanism for oiling, cleaning and repairing of same.

In steering the machine to either side, the endless track at one side of the machine will, of course, travel slower than the track at the other side, said difference in motion is equalized by the pinions 68, so that while the gear 57 carrying said pinions rotates at an average speed of the two bevel gears 69, the latter two may rotate at any required difference of speed.

What I claim is:—

In a tractor, a frame, traction wheels supporting the frame and arranged one pair at each side of the frame, endless self laid broad link tracks stretched one about each pair of wheels and having operative connection therewith and shielding plates carried by the frame and fitting snugly to the edges of the endless tracks the upper portion of said plates being of door-like character to give access to the interior of the traction mechanism.

In testimony whereof I affix my signature, in presence of two witnesses.

JOHN PITTINGS.

Witnesses:
F. W. GAFFNEY,
F. A. RINKEL.